(12) United States Patent
Verbridge et al.

(10) Patent No.: US 11,618,312 B2
(45) Date of Patent: Apr. 4, 2023

(54) ELECTRIC VEHICLE POWERTRAIN ASSEMBLY

(71) Applicant: Rivian IP Holdings, LLC, Plymouth, MI (US)

(72) Inventors: Mason Verbridge, Canton, MI (US); Gary Gloceri, Waterford, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 644 days.

(21) Appl. No.: 16/695,815

(22) Filed: Nov. 26, 2019

(65) Prior Publication Data

US 2020/0164736 A1 May 28, 2020

Related U.S. Application Data

(60) Provisional application No. 62/771,524, filed on Nov. 26, 2018.

(51) Int. Cl.
| | |
|---|---|
| B60K 7/00 | (2006.01) |
| B60K 1/02 | (2006.01) |
| B60K 17/356 | (2006.01) |
| B60K 1/00 | (2006.01) |

(52) U.S. Cl.
CPC ............ *B60K 7/0007* (2013.01); *B60K 1/02* (2013.01); *B60K 17/356* (2013.01); *B60K 2001/001* (2013.01)

(58) Field of Classification Search
CPC ........ B60K 7/007; B60K 1/02; B60K 17/356; B60K 2001/001
See application file for complete search history.

(56) References Cited

U.S. PATENT DOCUMENTS

| | | | | |
|---|---|---|---|---|
| 2012/0248850 A1* | 10/2012 | Hirano | ................... | F16D 65/12 |
| | | | | 301/6.5 |
| 2014/0033846 A1 | 2/2014 | Suto | | |
| 2016/0229289 A1* | 8/2016 | Frohn | ................. | B60K 17/043 |

FOREIGN PATENT DOCUMENTS

| | | | | | |
|---|---|---|---|---|---|
| CN | 109515143 A | * | 3/2019 | ............ | B60B 35/16 |
| DE | 10 2015 212811 | | 1/2017 | | |
| WO | WO-2017178103 A1 | * | 10/2017 | ............ | B60K 6/387 |
| WO | WO-2017207977 A1 | * | 12/2017 | ............... | B60K 1/02 |

OTHER PUBLICATIONS

International Search Report and Written Opinion of PCT/US2019/063284 dated Mar. 12, 2020.

* cited by examiner

*Primary Examiner* — Jacob D Knutson
(74) *Attorney, Agent, or Firm* — Haley Guiliano LLP

(57) ABSTRACT

The drivetrain system includes an I shield, two motors, two A-shields, and a gearset. Each A-shield is affixed to a respective one of the two motors, and each A-shield is also affixed to the I-shield. The gearset includes a motor shaft of one of the motors and a motor gear affixed to the motor shaft. Three motor bearings are arranged co-linearly and coupled to the motor shaft. The gearset also includes an intermediate shaft and a wheel gear affixed to the intermediate shaft and engaged with the first motor gear. A pinion gear is also affixed to the intermediate shaft. Two intermediate bearings are arranged co-linearly and coupled to the intermediate shaft. The gearset also includes a drive shaft and a drive gear affixed to the drive shaft and engaged with the first pinion gear. The motor shaft, intermediate shaft and drive shaft form a shaft angle that may allow compactness.

19 Claims, 6 Drawing Sheets

ELECTRIC VEHICLE POWERTRAIN ASSEMBLY

CROSS-REFERENCE TO RELATED APPLICATION

This application claims the benefit of U.S. Provisional Patent Application No. 62/771,524, filed Nov. 26, 2018, the disclosure of which is hereby incorporated by reference herein in its entirety.

The present disclosure is directed towards a powertrain assembly, and more particularly towards a powertrain assembly for an electric vehicle.

SUMMARY

Electric vehicles include electric powertrains. The arrangements of electric vehicle powertrains are dependent on design considerations, crash considerations, and performance considerations. It would be advantageous to provide a relatively more compact powertrain arrangement for an electric vehicle.

In some embodiments, the present disclosure is directed to a drivetrain system. The drivetrain system includes an I shield, two motors, two A-shields, and a gearset. Each A-shield is affixed to a respective one of the two motors, and each A-shield is also affixed to the I-shield. The gearset includes a motor shaft of one of the motors and a motor gear affixed to the motor shaft. Three and only three motor bearings are arranged co-linearly and coupled to the motor shaft. The gearset also includes an intermediate shaft and a wheel gear affixed to the intermediate shaft and engaged with the first motor gear. A pinion gear is also affixed to the intermediate shaft. Two intermediate bearings are arranged co-linearly and coupled to the intermediate shaft. The gearset also includes a drive shaft and a drive gear affixed to the drive shaft and engaged with the first pinion gear.

In some embodiments, the drivetrain system includes a horseshoe-shaped bearing retention plate affixed to a first A-shield. In some such embodiments, the three motor bearings include a mid-bearing positioned in a recess of the first A-shield. Further, in some such embodiments, the horseshoe-shaped bearing retention plate is configured to maintain the position of the mid-bearing in the recess. In some embodiments, a wheel gear is positioned axially adjacent to the mid-bearing and in an opening of the horseshoe shaped bearing retention plate.

In some embodiments, the first motor shaft includes a motor axis, the intermediate shaft includes an intermediate axis, and the first drive shaft includes a drive axis. In some such embodiments, the motor axis, intermediate axis, and drive axis define a shaft angle greater than 50 degrees. For example, the shaft angle may be 60 degrees, or greater than 60 degrees.

In some embodiments, the drivetrain system includes a second gearset. The second gearset may be similar to the first gearset and coupled to the other motor.

In some embodiments, the drivetrain system is capable of being used as a front drivetrain system and a rear drivetrain system. For example, the drivetrain system may be modular.

In some embodiments, the drivetrain system has a first orientation as the front drivetrain system and a second orientation as a rear drivetrain system. For example, in some such embodiments, the second orientation is rotated 180 degrees about a vertical axis relative to the first orientation. In some embodiments, the drivetrain system includes a first gear orientation as the front drivetrain system and a second and opposite gear orientation as the rear drivetrain system.

In some embodiments, the drivetrain system includes two inverter cores and a lid configured to house the inverter cores. In some such embodiments, the inverter cores are modular. In some embodiments, the lid comprises an opening configured to receive a top cover and provide access to power electronics components.

In some embodiments, the intermediate bearings include an inner bearing and an outer bearing, wherein the outer bearing is arranged axially inward of an axially outer portion of the first wheel gear.

In some embodiments, the present disclosure is directed to an electric vehicle comprising a first drivetrain system and a second drivetrain system. In some embodiments, the first drivetrain system and the second drivetrain system each comprise the drivetrain system described above. In some embodiments, the first drivetrain system comprises a front drivetrain system and the second drivetrain system comprises a rear drivetrain system. In some such embodiments, the front drivetrain system comprises a first orientation and the rear drivetrain system comprises a second orientation, which is rotated 180 degrees about a vertical axis relative to the first orientation as described above. In some embodiments, the front drivetrain system comprises a first gear orientation and the rear drivetrain system comprises a second and opposite gear orientation from the front drivetrain system.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

In some embodiments, an electric drivetrain may include one or more electric motors configured to achieve torque vectoring (e.g., a four-motor architecture). For example, a Front Drive Unit (FDU) and a Rear Drive Unit (RDU) may be identical, and each may include two inverter cores, two motors, and two independent gearsets integrated into a compact and cost-efficient package. In some embodiments, the present disclosure is directed to assemblies having high commonality of components (e.g., between all four motor/gearbox/inverter assemblies). In some embodiments, the present disclosure is directed to assemblies having relatively reduced stack-up widths configured for larger motors, smaller vehicles, or both.

Figure 1:
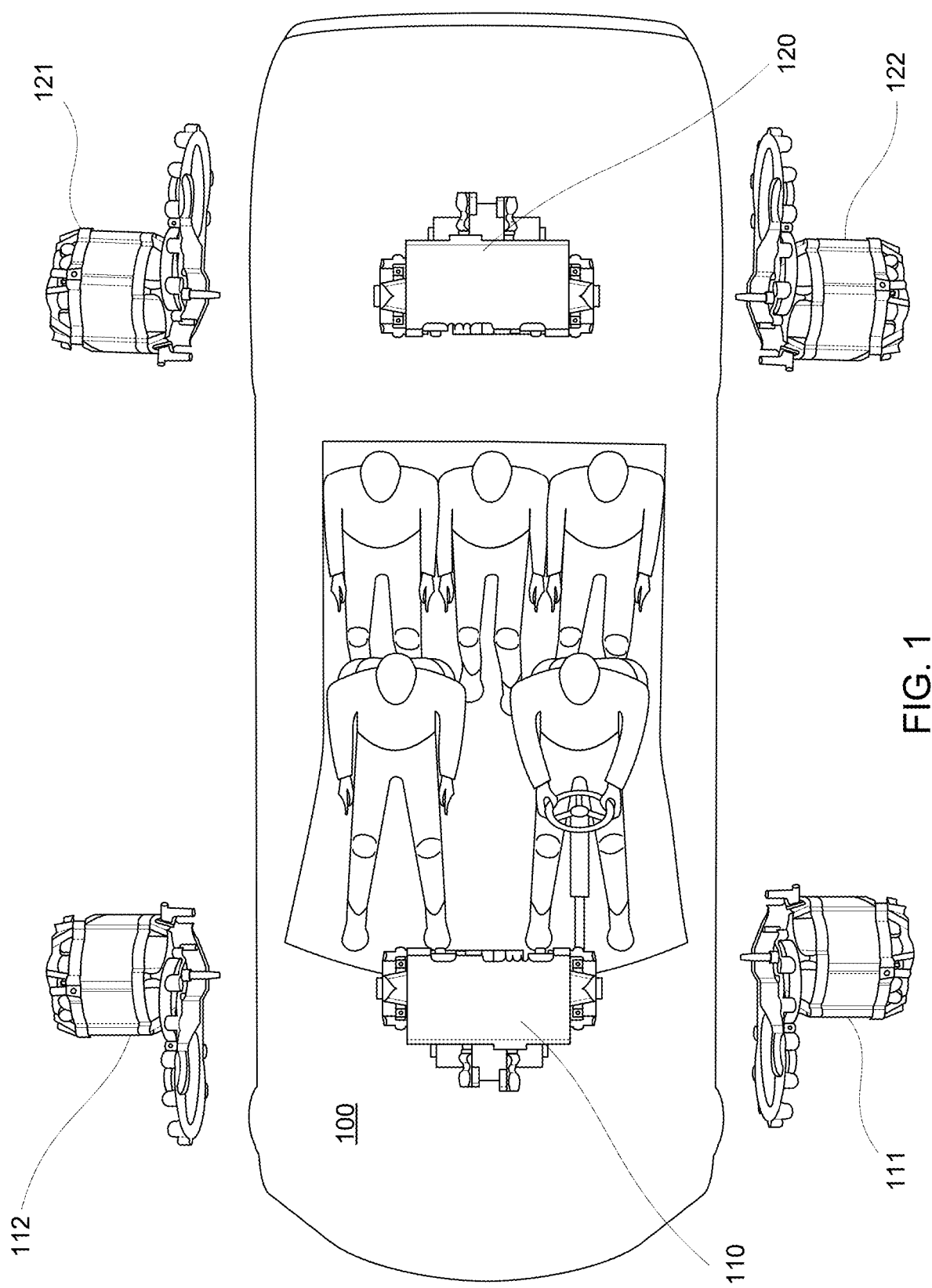
FIG. 1 shows a top view of illustrative components of an electric vehicle, in accordance with some embodiments of the present disclosure.

FIG. 1 shows a top view of illustrative components of electric vehicle 100, in accordance with some embodiments of the present disclosure. In some embodiments, a vehicle may include two or more electric motors, arranged in one or more drive units. For example, some of the motor assemblies may be identical, while some may have different handedness or shaft rotation direction relative to the motor. As illustrated, front drive unit 110 and rear drive unit 120 are oriented differently. Specifically, front drive unit 110 is rotated 180 degrees about a vertical axis (e.g., out of the page as illustrated) relative to rear drive unit 120. Accordingly, the handedness of front drive unit 110 and rear drive unit 120 are different. As such, the gear orientation in front drive unit 110 and rear drive unit 120 may be opposite to accommodate the opposite shaft rotations.

Also illustrated in FIG. 1 is an exploded view of motor assembly 111, motor assembly 112, motor assembly 121, and motor assembly 122. Motor assemblies 111 and 112 are included in front drive unit 110 (e.g., along with other components). Motor assemblies 121 and 122 are included in rear drive unit 120 (e.g., along with other components). As illustrated, motor assemblies 111 and 121 have similar handedness as each other (i.e., motor assembly 111 is similar to motor assembly 121, but rotated 180 degrees about a vertical axis). As illustrated, motor assemblies 112 and 122 have handedness similar to each other and opposite to that of motor assemblies 111 and 121. Because front drive unit 110 and rear drive unit 120 are rotated relative to each other, the handedness of the gears may, in some embodiments, be opposite to each other. For example, because during forward motion the output shafts rotate in opposite orientations relative to the respective drive units, the gearing must be reversed to achieve desired gear lash and engagement.

Figure 2:
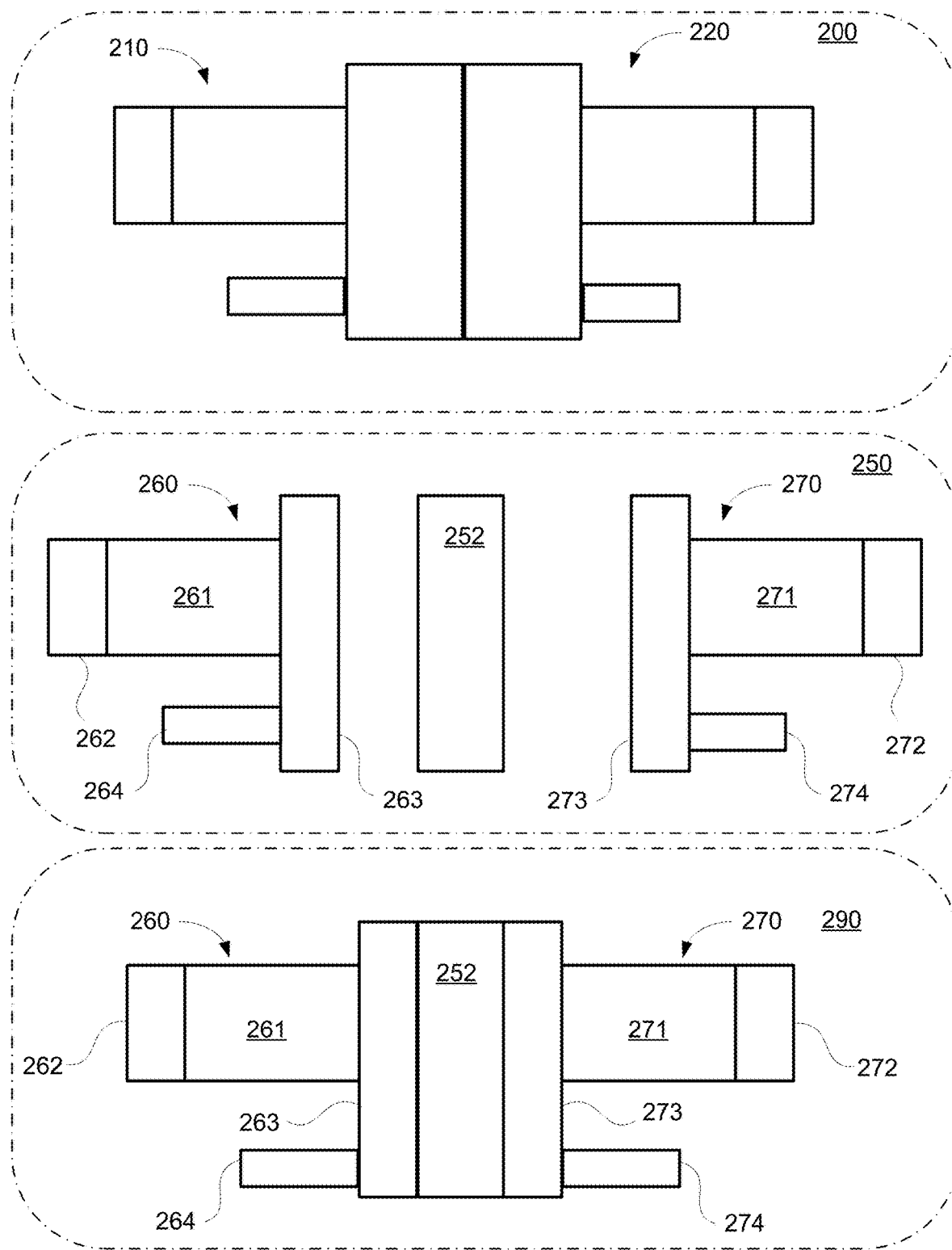
FIG. 2 shows three illustrative drive unit configurations, in accordance with some embodiments of the present disclosure.

FIG. 2 shows three illustrative drive unit configurations, in accordance with some embodiments of the present disclosure. Configuration 200 includes two separate motor drives 210 and 220, each capable of operating as a single drive. Each of motor drive 210 and 220 may be, for example, sealed, mechanically separate (e.g., complete bearings and lubrication systems), and include a motor, gearbox, and output (e.g., an output spline or output half-shaft).

Configuration 250 includes motor drives 260 and 270, illustrated in an exploded view (e.g., unassembled). Motor drives 260 and 270 are configured to be coupled together by intermediate housing 252. In some embodiments, each of motor drives 260 and 270, while including a motor (e.g., motors 261 and 271), full gearset (e.g., gearsets 263 and 273), and output (e.g., half-shafts 264 and 274), need not be configured for stand-alone operation. As illustrated, motor drives 260 and 270 include, respectively, B-shields 262 and 272, which may be configured to house a bearing, manage electrical terminations, provide cooling, provide mounting, any other suitable functions, or any suitable combination thereof. In some embodiments, motor drives 260 and 270 need not be sealing. For example, intermediate housing 252 (e.g., I-shield) may be configured to seal against both motor drive 260 and motor drive 270. Intermediate housing 252 may be configured to seal lubricant (e.g., bearing oil), seal coolant (e.g., water, mixtures, oil), provide noise reduction (e.g., attenuate gear-induced audible noise and vibration), align motor drives 260 and 270 to each other, mount motor drives 260 and 270 to a frame or other structural element, house one or more shaft bearings (e.g., one or more bearings for a motor shaft, intermediate shaft, output shaft, or a combination thereof), any other suitable functionality, or any suitable combination thereof.

Configuration 290 includes motor drives 260 and 270 in an assembled state. For example, motor drives 260 and 270 may be affixed to intermediate housing 252 using fasteners (e.g., bolts, threaded studs and nuts), clamps, latches, mechanical interlocks, any other suitable affixments, or any combination thereof. In some embodiments, intermediate housing 252, motor drive 260, motor drive 270, or a combination thereof may include alignment features that spatially align two or more components, constrain relative motion, or both. For example, intermediate housing 252 may allow each of motor drives 260 and 270 to be shorter (e.g., along the left-right axis, as illustrated in FIG. 2). In a further example, configuration 290 may be shorter than configuration 200 along the left-right axis, as illustrated, because motor drives 260 and 270 need not require fully sealed gearsets 263 and 273. Motor drives 210 and 220, which are stand-alone, include housings that completely seal against lubrication, coolant, or both, and also house all bearings of the respective gearsets.

Figure 3:
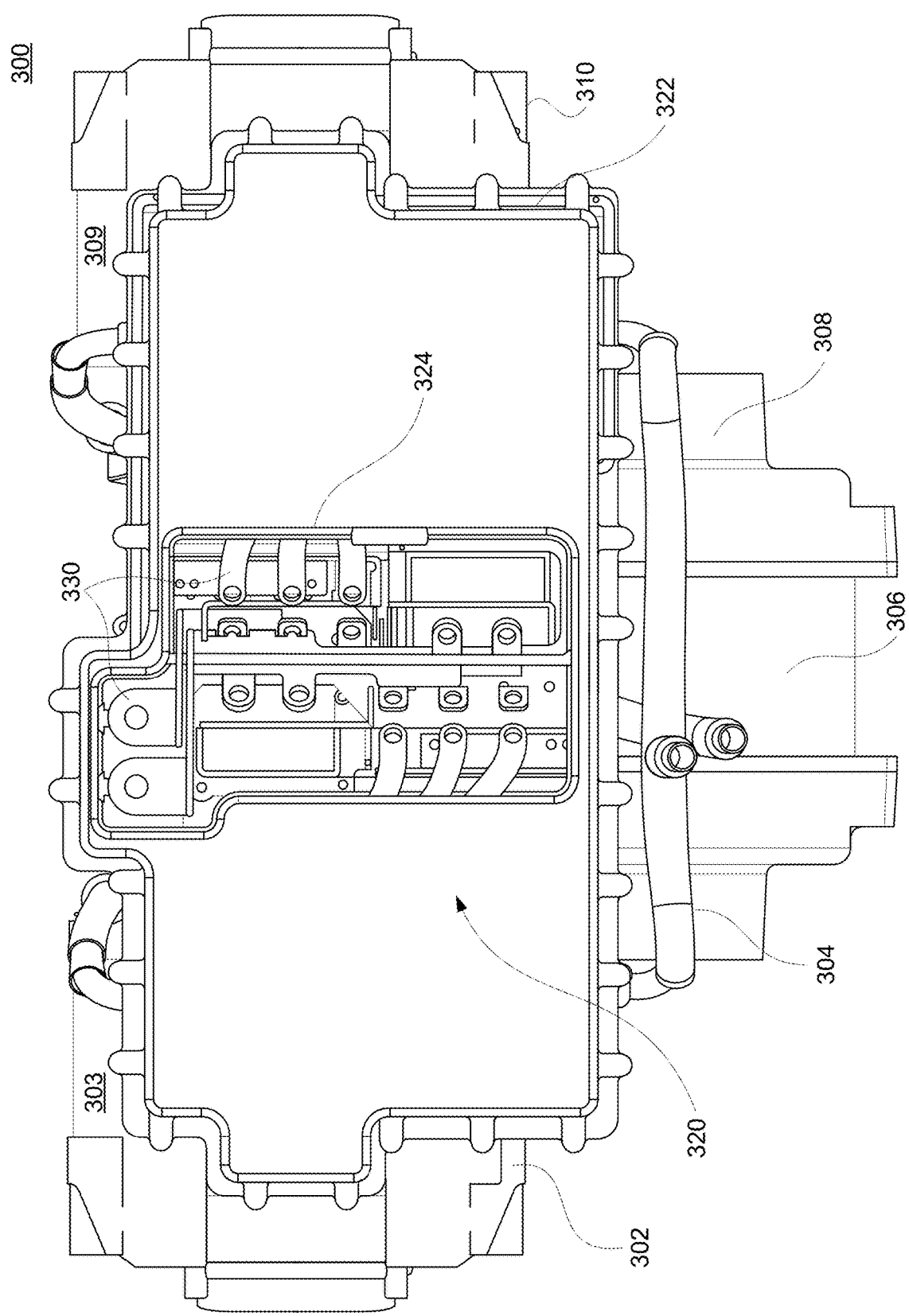
FIG. 3 shows a top view of an illustrative drivetrain system, with power electronics, in accordance with some embodiments of the present disclosure.

FIG. 3 shows a top view of illustrative drivetrain system 300, with power electronics 320, in accordance with some embodiments of the present disclosure. As illustrated, drivetrain system 300 includes motor drives 303 and 309, arranged opposite each other. Motor drives 303 and 309 include respective B-shields 302 and 310 (e.g., to seal the outward portion of the respective motor and house a bearing), respective stator housings (e.g., configured to house stator windings and electrical connections), respective rotating shafts, and respective A-shields 304 and 308 (e.g., configured to house gears and bearings, and interface to an I-shield 306). Power electronics 320 are included in the assembly, as illustrated, and are electrically coupled to the windings of the motors of motor drives 303 and 309. For example, power electronics 320 may include switches (e.g., relays, transistors, contactors), capacitors, any other high-voltage or high-current components (e.g., AC or DC), or any combination thereof. Power electronics cover 322 may include, for example, a die-cast lid or other suitable covering that encloses power electronics 320. In some embodiments, as illustrated, power electronics cover 322 includes an opening 324 that is configured to receive a smaller top cover. Opening 324 provides easy access to electrical terminals 330 (e.g., including DC bus terminals, AC terminals, or both). As illustrated, the smaller top cover is removed, revealing electrical terminals 330.

Figure 4:
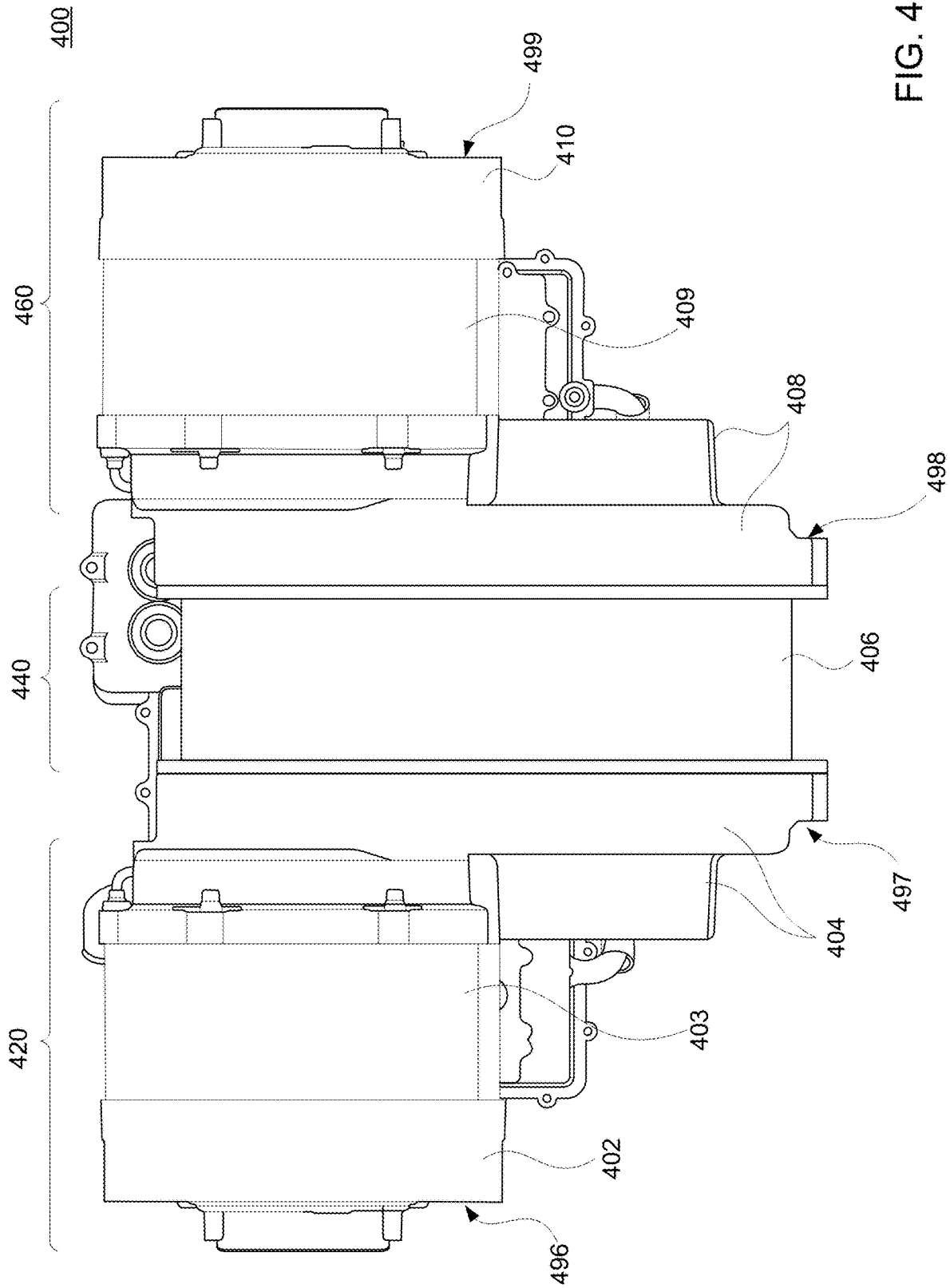
FIG. 4 shows a top view of an illustrative drivetrain system, in accordance with some embodiments of the present disclosure.

FIG. 4 shows a top view of illustrative drivetrain system 400, in accordance with some embodiments of the present disclosure. In some embodiments, integrated A-shields 404 and 408 allow a relatively compact dual motor assembly (e.g., motors 420 and 460). In some embodiments, drivetrain system 400 may be mounted to a vehicle via bushings (e.g., for maintaining position and damping vibration) at suitable locations (e.g., four locations 496, 497, 498 and 499) as illustrated with two inner locations (e.g., locations 497 and 498) and two outer locations (e.g., locations 496 and 499). Motor 420 includes B-shield 402, housing 403, and a portion of A-shield 404, along with a rotary shaft and windings (not shown). Motor 460 includes B-shield 410, housing 409, and a portion of A-shield 408, along with a rotary shaft and windings (not shown). Intermediate housing 406 (e.g., an I-shield) is configured to affix A-shields 404 and 408 together.

Figure 5:
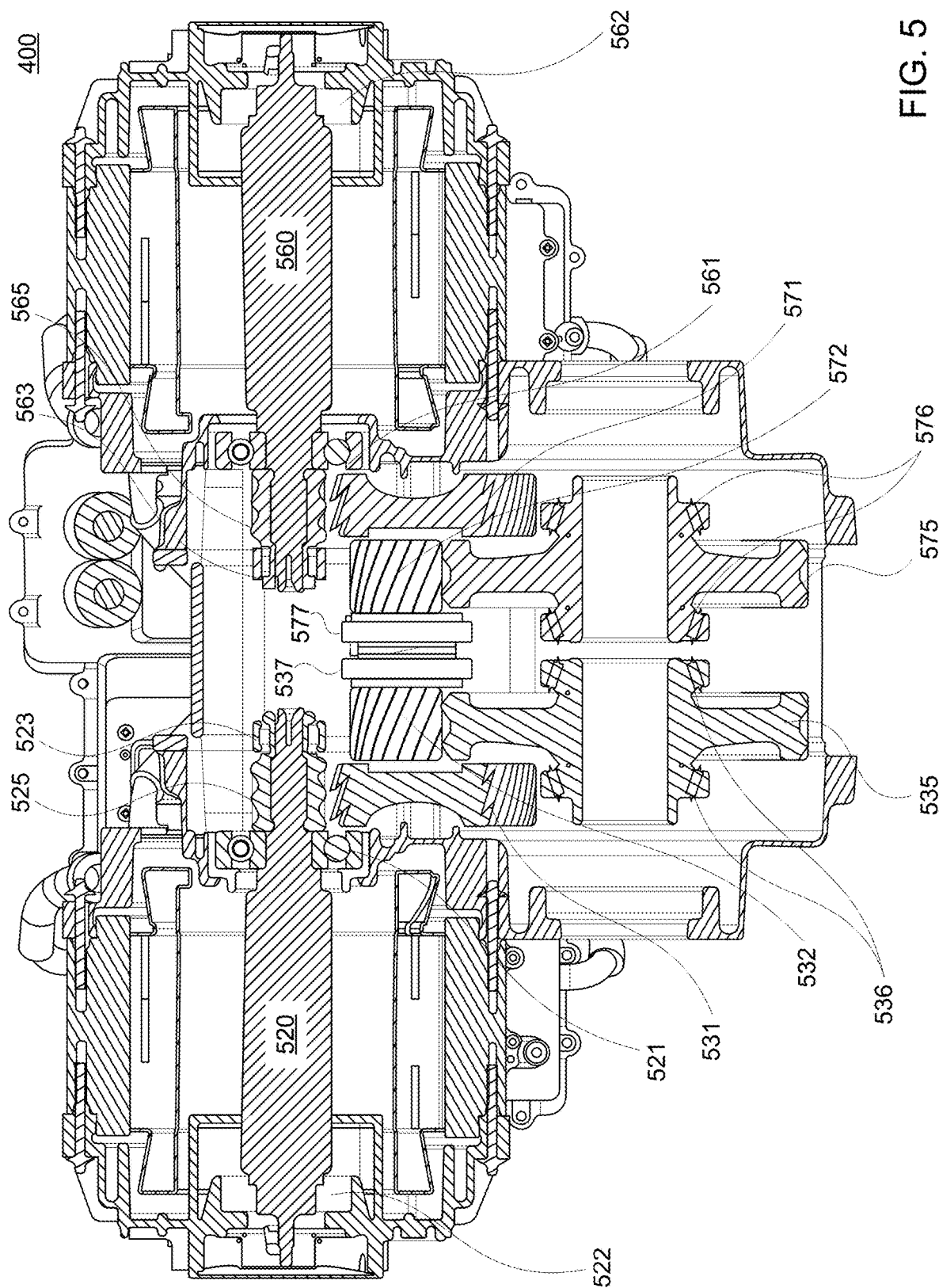
FIG. 5 shows a top cross-sectional view of the illustrative drivetrain system of FIG. 4, in accordance with some embodiments of the present disclosure.

FIG. 5 shows a top cross-sectional view of illustrative drivetrain system 400 of FIG. 4, in accordance with some embodiments of the present disclosure. Motors 420 and 460 include respective motor shafts 520 and 560, to which respective motor gears 525 and 565 are affixed. Each of motor shafts 520 and 560 is positioned by three bearings: an outer bearing (not shown), a mid-bearing (e.g., bearing 521 and bearing 561, respectively), and an inner bearing (e.g., bearing 523 and bearing 563, respectively). Motor gears 525 and 565 engage with respective wheel gears 531 and 571 affixed to respective intermediate shafts (not shown). Also affixed to the respective intermediate shafts are respective pinion gears 532 and 572. Each intermediate shaft is arranged in a respective position by a respective inner bearing (e.g., respective bearings 537 and 577) and a respective outer bearing (not visible in the cross-sectional view). For example, the inner bearing of the intermediate shaft may be captured by I-shield 406 of FIG. 4 (e.g., mounted to, aligned to or both). Each of pinion gears 532 and 572 engages respective drive gears 535 and 575 affixed to a respective drive shaft. Each of drive gears 535 and 575 is positioned by a respective pair of tapered bearings that include inner bearings and outer bearings 536 and 576, which are configured to react axial loads. For example, the axial loads may arise from a drive shaft (not shown) coupled to the respective drive gear. In some embodiments, wheel gears 531 and 571 may be positioned axially adjacent to, or overlapping with, the respective motor (e.g., motor 420 or 460), depending upon the size of the motor gear (e.g., motor gear 525 and 565) and mid bearing (e.g., bearings 521 and 561).

Figure 6:
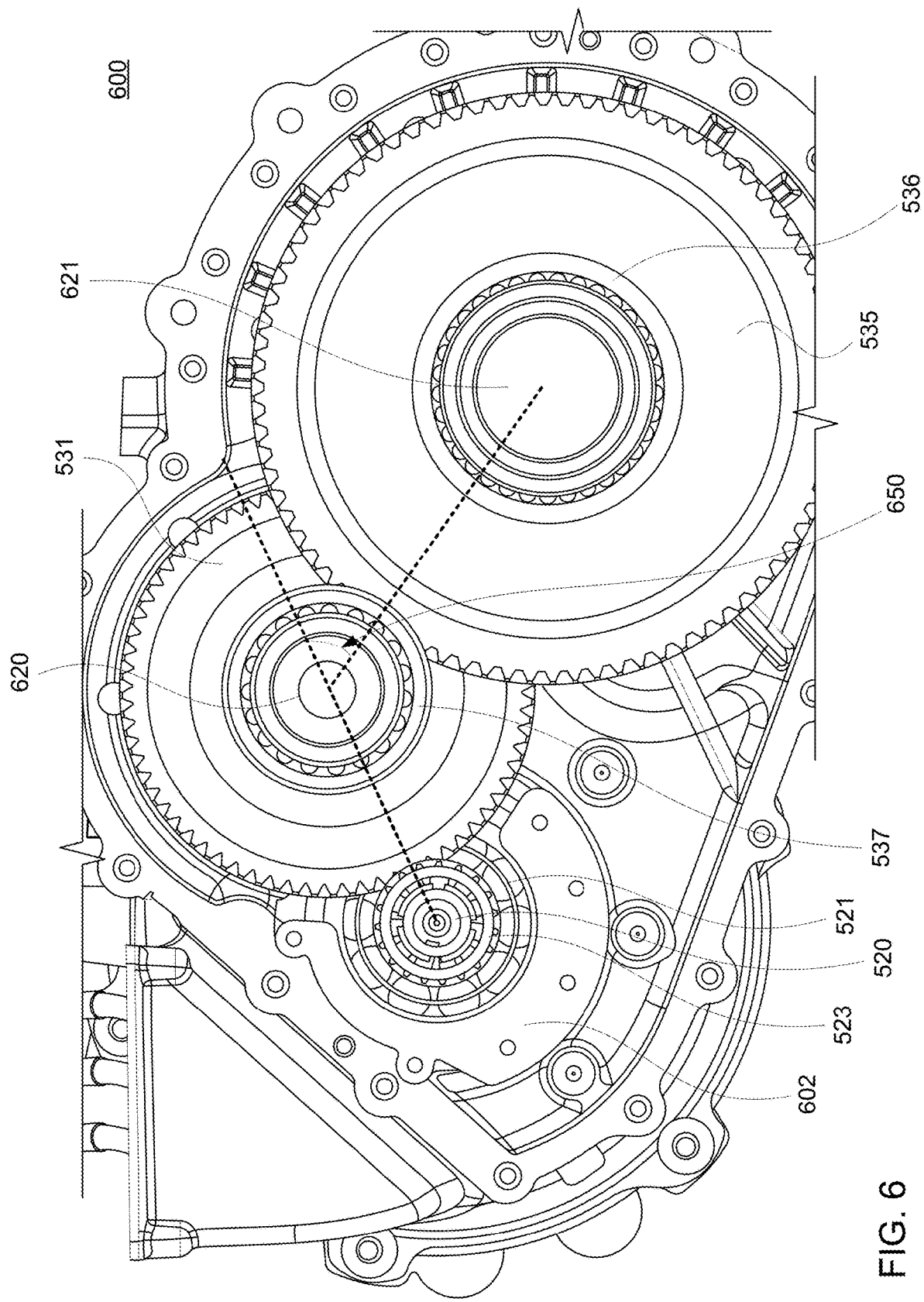
FIG. 6 shows an end view of an illustrative motor and A-shield assembly of FIGS. 4-5, including intermediate and drive shafts and gears, in accordance with some embodiments of the present disclosure.

FIG. 6 shows an end view of illustrative motor and A-shield assembly 600 (e.g., including motor 420 and A-shield 404), including intermediate and drive shafts and gears, in accordance with some embodiments of the present disclosure. Retention plate 602 holds inner motor shaft bearing 523 in place and is configured to react axial loads. Motor shaft 520, intermediate shaft 620, and drive shaft 621 have respective axes arranged with shaft angle 650 (e.g., sometimes referred to as a "dog-leg angle"). For example, as shaft angle 650 is increased from 0 degrees, the length of the drivetrain assembly, in the fore-and-aft direction of an electric vehicle, may be reduced while bearing loads increase. In some embodiments, shaft angle 650 is approximately equal to (e.g., within 2.5°) or greater than 50°, 55°, 60°, 65°, 70°, 75°, 80°, 85°, and 90°.

In some embodiments, a drivetrain system includes a three-bearing design at the motor shaft (e.g., bearings 521, 522, and 523 at motor shaft 520, as illustrated in FIG. 5). The use of three bearings, rather than four or more bearings, allows a redundant bearing to be eliminated and the design simplified. For example, the integration of the gearbox housing and the A-shield of the motor allows a bearing to be removed. To illustrate, a conventional gearbox may include two bearings on the first shaft, and a conventional electric motor may include two bearings on the motor shaft. Typically, the first shaft would engage with the motor shaft (e.g., via splines or keys), and the compound shaft would then include four bearings.

In some embodiments, the drivetrain system includes bearing retention plate 602 configured to minimize axial stack up of wheel gear 531 to electric motor 420. For example, bearing retention plate 602 may be configured to react axial loads along motor shaft 520 (e.g., from engagement of helical gears). In a further example, bearing retention plate 602 may be configured to maintain alignment of intermediate motor bearing 521. In a further example, bearing retention plate 602 may be affixed to A-shield 404, which is coupled to the respective motor housing 403. As illustrated, bearing retention plate 602 is semi-circular-shaped (e.g., horseshoe-shaped), with a section having a relatively reduced radial width. In some embodiments, as illustrated, bearing retention plate 602 extends along the azimuthal direction only partially (e.g., it does not extend a full 360° around the motor shaft). This enables wheel gear 531 to be positioned axially closer to motor A-shield 404 than if bearing retention plate 602 extended a full 360° around motor shaft 520. Bearing retention plate 602 may have any suitable thickness (e.g., formed from a bar, plate, sheet, or a combination thereof).

In some embodiments, the drivetrain system (drivetrain system 400) includes an integrated gearbox housing and motor A-shield, which may help reduce part count, cost and mass, and promotes active cooling of the gear oil, gearset, bearings, any other suitable components, or any combination thereof.

In some embodiments, axial clearances within the drivetrain system (e.g., drivetrain system 400) are optimized, minimized, or otherwise reduced. For example, the drivetrain system (e.g., drivetrain system 400) may include a resolver (e.g., an encoder) configured to achieve the reduced width (e.g., by selecting resolver selection/package or screw length). The resolver may be integrated into the design so as not to add width to the assembly. In a further example, the drivetrain system may include one or more handling features on a rotor near lamination stacks of the motor (e.g., integrated into the A-shield or motor housing, or both). A handling feature may include a boss, a recess, or other feature for carrying, positioning, or otherwise handling the motor. In a further example, the active length of the motor or number of stator end turns may be selected to achieve a reduced width. In a further example, the integrated A-shield may help reduce machining tolerances on one or more I-shield bearings, associated hardware, or both. In a further example, the drivetrain system may include a gear face width configured to achieve a reduced axial stack up. In a further example, the drivetrain system may include a bearing configured to achieve a reduced axial stack up. In a further example, the drivetrain system may include a first wheel gear bearing tucked into the wheel gear axially (e.g., on the intermediate shaft). To illustrate, the wheel gear bearing may be axially inward of the axially outer portion of the wheel gear (e.g., such that it would not be visible in a top view of the wheel gear). In a further example, the drivetrain system may include a minimized I-shield width between intermediate shafts (e.g., thus reducing the overall drivetrain width, in a side-to-side direction of the vehicle). To illustrate, because there are not two separate gearboxes coupled together, there need not be a separating wall between the gearboxes.

In some embodiments, the drivetrain system includes an increased dog leg angle, which allows a thinner spatial footprint. For example, some features of the A-shield, I-shield, geartrain, or a combination thereof may include relatively more robust construction, relatively higher stiffness, or otherwise be configured to withstand increased shear stress from the increased dog-leg angle.

In some embodiments, the drivetrain system includes one or more integrated inverter cores arranged in a single lid for modularity (e.g., for a single motor DU). For example, the integrated inverter cores may still allow an optimized package of the drivetrain system.

In some embodiments, the drivetrain system may include features for bus bar cooling through one or more motor cooling passage and inverter heatsink (e.g., the lid itself).

In some embodiments, the drivetrain of the present disclosure may include common parts (e.g., at each of four motors, or at each drive unit). For example, a common part may include an A-shield, a B-shield, a rotor shaft, a stator and/or stator housing, a gearset, a resolver, a motor mount bushing (e.g., inner or outer bushing), a half-shaft, an inverter, an inverter lid, a bus bar, wiring connections (e.g., low voltage, high voltage, DC or AC), any other suitable part, or any combination thereof. In some embodiments, for example, a vehicle may include four motors and gearsets. Common parts may be used in each of the motor and gearset assemblies. In some embodiments, for example, a vehicle may include four motors and gearsets arranged into an FDU and RDU. Respective common parts may be used in the FDUs and RDUs (e.g., and may be, but need not be, interchangeable between FDU and RDU). In an illustrative example, each motor may be identical, and there may be two A-shield parts having two orientations. As illustrated in FIG. 1, there are two assemblies (e.g., motor assemblies 111 and 121 on the one hand and motor assemblies 112 and 122 on the other hand).

In some embodiments, the drivetrain may include two motors, two A-shields and two gearsets, each side having cooling passages. In some embodiments, the arrangement of the motors may allow the respective cooling passages to be coupled in series or parallel for coolant flow. For example, in some such embodiments, cooling passages of a single motor may have a single inlet or outlet port, and a second port for coupling to another motor.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:
1. A drivetrain system comprising:
an I shield;
a first A-shield affixed to a first motor and the I-shield;
a horseshoe shaped retention plate;
a second A-shield affixed to a second motor and the I-shield;
a first gearset comprising:
a first motor shaft of the first motor;
a first motor gear affixed to the first motor shaft;
a first wheel gear engaged with the first motor gear;
three and only three motor bearings arranged co-linearly and coupled to the first motor shaft, wherein the three motor bearings comprise a mid-bearing retained in a recess of the first A-shield by the horseshoe-shaped retention plate, and wherein the first wheel gear is positioned axially adjacent to the mid-bearing and in an opening of the horseshoe-shaped retention plate.

2. The drivetrain system of claim 1, wherein:
the horseshoe shaped retention plate is affixed to the first A-shield.
3. The drivetrain system of claim 1, wherein:
the first motor shaft comprises a motor axis;
the first wheel gear is affixed to a first intermediate shaft
the first intermediate shaft comprises an intermediate axis;
the first gearset further comprises a first drive shaft comprising a drive axis;
the motor axis, intermediate axis, and drive axis define a shaft angle; and
the shaft angle is greater than 50 degrees.
4. The drivetrain system of claim 3, wherein the shaft angle is approximately 60 degrees.
5. The drivetrain system of claim 3, wherein the shaft angle is greater than 60 degrees.
6. The drivetrain system of claim 1, wherein the first gearset further comprises:
a first intermediate shaft;
a first pinion gear affixed to the first intermediate shaft;
a first drive shaft;
a first drive gear affixed to the first drive shaft and engaged with the first pinion gear; and
two intermediate bearings arranged co-linearly and coupled to the first intermediate shaft.
7. The drivetrain system of claim 6, further comprising:
a second gearset comprising:
a second motor shaft of the second motor;
a second motor gear affixed to the second motor shaft;
a second intermediate shaft;
a second wheel gear affixed to the second intermediate shaft and engaged with the second motor gear;
a second pinion gear affixed to the second intermediate shaft;
a second drive shaft;
a second drive gear affixed to the second drive shaft and engaged with the second pinion gear;
three and only three motor bearings arranged co-linearly and coupled to the second motor shaft; and
two intermediate bearings arranged co-linearly and coupled to the second intermediate shaft.
8. The drivetrain system of claim 1, wherein the drivetrain system comprises a modular system capable of being used as a front drivetrain system and a rear drivetrain system.
9. The drivetrain system of claim 8, wherein:
the drivetrain system comprises a first orientation as the front drivetrain system;
the drivetrain system comprises a second orientation as a rear drivetrain system; and
the second orientation is rotated 180 degrees about a vertical axis relative to the first orientation.
10. The drivetrain system of claim 9, wherein:
the drivetrain system comprises a first gear orientation as the front drivetrain system; and
the drivetrain system comprises a second and opposite gear orientation as the rear drivetrain system.
11. The drivetrain system of claim 1, further comprising:
a first inverter core;
a second inverter core, wherein the first and second inverter cores are positioned outside of the first A-shield, the second A-shield, and the I shield; and
a lid configured to enclose the first inverter core and the second inverter core, wherein the first and second inverter cores are modular.
12. The drivetrain system of claim 11, wherein the lid comprises an opening configured to receive a top cover and provide access to power electronics components.

13. The drivetrain system of claim 1, further comprising two intermediate bearings comprising an inner bearing and an outer bearing, wherein the outer bearing is arranged axially inward of an axially outer portion of the first wheel gear.

14. An electric vehicle, comprising:
a first drivetrain system, comprising:
  a first A-shield affixed to a first motor and a first I-shield;
  a first horseshoe-shaped retention plate affixed to the first A-shield;
  a second A-shield affixed to a second motor and the first I-shield;
  a first gearset comprising:
    a first motor shaft of the first motor;
    a first motor gear affixed to the first motor shaft;
    a first wheel gear engaged with the first motor gear;
    three motor bearings arranged co-linearly and coupled to the first motor shaft, wherein the three motor bearings comprise a mid-bearing retained in a recess of the first A-shield by the horseshoe-shaped retention plate, and wherein the first wheel gear is positioned axially adjacent to the mid-bearing and in an opening of the horseshoe-shaped retention plate; and
a second drivetrain system, comprising:
  a third A-shield affixed to a third motor and a second I-shield;
  a fourth A-shield affixed to a fourth motor and the second I-shield;
  a second gearset comprising:
    a second motor shaft of the third motor;
    a second motor gear affixed to the second motor shaft;
    another three motor bearings arranged co-linearly and coupled to the second motor shaft.

15. The electric vehicle of claim 14, wherein:
the first drivetrain system comprises a front drivetrain system; and
the second drivetrain system comprises a rear drivetrain system.

16. The electric vehicle of claim 15, wherein:
the front drivetrain system comprises a first orientation;
the rear drivetrain system comprises a second orientation; and
the second orientation is rotated 180 degrees about a vertical axis relative to the first orientation.

17. The electric vehicle of claim 16, wherein:
the front drivetrain system comprises a first gear orientation; and
the rear drivetrain system comprises a second and opposite gear orientation from the front drivetrain system.

18. The electric vehicle of claim 14 wherein each of the first drivetrain system and second drivetrain system comprises:
a first inverter core;
a second inverter core, wherein the first and second inverter cores are positioned outside of the first A-shield, the second A-shield, and the I shield; and
a lid configured to enclose the first inverter core and the second inverter core, wherein the first and second inverter cores are modular.

19. The electric vehicle of claim 14, further comprising power electronics components and an opening in the respective drivetrain and configured to receive a top cover and provide access to the power electronics components.

* * * * *